(12) United States Patent
Ostroverkhov et al.

(10) Patent No.: US 12,403,650 B2
(45) Date of Patent: Sep. 2, 2025

(54) ADDITIVE MANUFACTURING METHODS AND SYSTEMS

(71) Applicant: General Electric Company, Schenectady, NY (US)

(72) Inventors: Victor Petrovich Ostroverkhov, Ballston Lake, NY (US); Christopher Darby Immer, Niskayuna, NY (US); Thomas Charles Adcock, Glenville, NY (US); Justin John Gambone, Schenectady, NY (US); Daniel Jason Erno, Clifton Park, NY (US); Brian Scott McCarthy, Clifton Park, NY (US); John Joseph Madelone, Jr., South Glen Falls, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/865,489

(22) Filed: Jul. 15, 2022

(65) Prior Publication Data

US 2024/0017481 A1    Jan. 18, 2024

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 12/45* (2021.01); *B28B 1/001* (2013.01);
(Continued)

(58) Field of Classification Search
None
See application file for complete search history.

(56) References Cited

U.S. PATENT DOCUMENTS

| | | |
|---|---|---|
| 4,917,484 A | 4/1990 | Heinz |
| 5,550,669 A | 8/1996 | Patel |

(Continued)

FOREIGN PATENT DOCUMENTS

| | | |
|---|---|---|
| CN | 112496339 A | 3/2021 |
| DE | 102017200793 A1 | 1/2018 |

(Continued)

OTHER PUBLICATIONS

Blanchet E. "English Machine Translation of WO 2021229171 A1: Method for the Additive Manufacture of an Object From a Powder Layer". Espacenet.EPO. 2023 (Year: 2023).*

(Continued)

*Primary Examiner* — Susan D Leong
*Assistant Examiner* — Jonathan B Woo
(74) *Attorney, Agent, or Firm* — Dinsmore & Shohl LLP (57) ABSTRACT

Methods of additively manufacturing a three-dimensional object include irradiating a first build plane region using a first energy beam defining a beam diameter, the first energy beam travelling along a first oscillating path in a first direction to consolidate a first wall defining a thickness perpendicular to the first direction, wherein a build material adjacent a first side of the first wall and the build material adjacent a second side of the first wall, opposite the first side of the first wall, remains unconsolidated; and wherein the thickness of the first wall is greater than the beam diameter.

16 Claims, 7 Drawing Sheets

(51) Int. Cl.
  *B22F 12/45* (2021.01)
  *B28B 1/00* (2006.01)
  *B29C 64/268* (2017.01)
  *B29C 64/282* (2017.01)
  *B33Y 10/00* (2015.01)
  *B33Y 30/00* (2015.01)

(52) U.S. Cl.
  CPC .......... *B29C 64/268* (2017.08); *B29C 64/282* (2017.08); *B33Y 10/00* (2014.12); *B33Y 30/00* (2014.12)

(56) References Cited

U.S. PATENT DOCUMENTS

| | | |
|---|---|---|
| 6,756,561 B2 | 6/2004 | McGregor et al. |
| 6,807,892 B2 | 10/2004 | Biegelsen et al. |
| 7,188,831 B2 | 3/2007 | Coppoolse |
| 7,899,569 B2 | 3/2011 | Holzwarth |
| 8,034,279 B2 | 10/2011 | Dimter et al. |
| 8,752,969 B1 | 6/2014 | Kane et al. |
| 9,527,246 B2 | 12/2016 | Wiesner et al. |
| 9,878,497 B2 | 1/2018 | Schwarze et al. |
| 10,035,188 B2 | 7/2018 | Weilhammer et al. |
| 10,337,335 B2 | 7/2019 | Pavlov et al. |
| 10,372,110 B2 | 8/2019 | Jagdale et al. |
| 10,399,183 B2 | 9/2019 | Dallarosa et al. |
| 10,406,633 B2 | 9/2019 | Crear et al. |
| 10,471,665 B1 | 11/2019 | Marshall, Jr. et al. |
| 10,661,514 B2 | 5/2020 | Talgorn et al. |
| 10,751,835 B2 | 8/2020 | Grapov et al. |
| 10,786,865 B2 | 9/2020 | Hellestam |
| 10,814,429 B2 | 10/2020 | Roychowdhury et al. |
| 10,821,551 B2 | 11/2020 | Roychowdhury et al. |
| 10,912,211 B2 | 2/2021 | Range et al. |
| 11,072,113 B2 | 7/2021 | Zeulner |
| 11,135,680 B2 | 10/2021 | Wuest et al. |
| 11,161,201 B2 | 11/2021 | Ostroverkhov et al. |
| 11,226,003 B2 | 1/2022 | Koczar et al. |
| 11,344,978 B2 | 5/2022 | DeMuth et al. |
| 2011/0311389 A1 | 12/2011 | Ryan et al. |
| 2012/0133080 A1 | 5/2012 | Moussa et al. |
| 2012/0267347 A1 | 10/2012 | Arjakine et al. |
| 2013/0216836 A1 | 8/2013 | Grebe et al. |
| 2013/0263977 A1 | 10/2013 | Rickenbacher et al. |
| 2014/0140882 A1 | 5/2014 | Syassen |
| 2014/0348691 A1 | 11/2014 | Ljungblad et al. |
| 2015/0198052 A1* | 7/2015 | Pavlov .................... F01D 5/284 416/241 B |
| 2015/0210013 A1 | 7/2015 | Teulet |
| 2017/0129185 A1* | 5/2017 | Buller .................. B23K 26/702 |
| 2017/0173883 A1 | 6/2017 | Gray et al. |
| 2017/0197278 A1 | 7/2017 | Garry et al. |
| 2017/0304894 A1 | 10/2017 | Buller |
| 2018/0099331 A1 | 4/2018 | Hoebel et al. |
| 2018/0178287 A1* | 6/2018 | Mamrak ............... B23K 26/342 |
| 2018/0207722 A1 | 7/2018 | Feldmann et al. |
| 2018/0281284 A1* | 10/2018 | Elgar .................... B29C 64/371 |
| 2018/0304406 A1 | 10/2018 | Roerig et al. |
| 2018/0326536 A1 | 11/2018 | Mentzel et al. |
| 2018/0345405 A1* | 12/2018 | Ostroverkhov ........ B33Y 50/02 |
| 2018/0345413 A1* | 12/2018 | Wuest .................... B33Y 30/00 |
| 2019/0017757 A1 | 1/2019 | Seeholzer et al. |
| 2019/0091935 A1 | 3/2019 | Weichsellbaumer et al. |
| 2019/0217542 A1 | 7/2019 | Pontiller-Schymura et al. |
| 2019/0232427 A1 | 8/2019 | Roychowdhury et al. |
| 2019/0232428 A1 | 8/2019 | Roychowdhury et al. |
| 2019/0291184 A1* | 9/2019 | Buller .................... B29C 64/20 |
| 2020/0223139 A1 | 7/2020 | Hunze et al. |
| 2020/0276667 A1 | 9/2020 | Filkins et al. |
| 2020/0353678 A1 | 11/2020 | Yeoh |
| 2021/0187830 A1 | 6/2021 | McCarthy et al. |
| 2021/0316409 A1 | 10/2021 | DeMuth et al. |
| 2022/0168813 A1 | 6/2022 | Dardis et al. |
| 2022/0176452 A1* | 6/2022 | De Chirico ........... B29C 64/268 |

FOREIGN PATENT DOCUMENTS

| | | | |
|---|---|---|---|
| WO | WO-2016196382 A1 * | 12/2016 | ............ B22F 3/1055 |
| WO | WO-2021229171 A1 * | 11/2021 | .............. B22F 10/28 |
| WO | WO2021229172 A1 | 11/2021 | |

OTHER PUBLICATIONS

Shi et al., Microstructural Control in Metal Laser Powder Bed Fusion Additive Manufacturing Using Laser Beam Shaping Strategy, Acta Materialia, vol. 184, Feb. 1, 2020, pp. 284-305. https://doi.org/10.1016/j.actamat.2019.11.053.

SLM Solutions, NXG XII 600, 10 Pages Retrieved Jan. 5, 2022 from https://www.slm-pushing-the-limits.com/specs#optical-system.

Tenbrock et al., Influence of Keyhole and Conduction Mode Melting for Top-Hat Shaped Beam Profiles in Laser Powder Bed Fusion, Journal of Materials Processing Technology, vol. 278, Apr. 2020, 10 Pages. https://doi.org/10.1016/j.imatprotec.2019.116514.

Tumkur et al., Nondiffractive Beam Shaping for Enhanced Optothermal Control in Metal Additive Manufacturing, Science Advances, vol. 17, Issue 38, Sep. 15, 2021, 12 Pages. https://www.science.org/doi/pdf/10.1126/sciadv.abg9358.

Cen et al., "Oscillating Laser-Arc Hybrid Additive Manufacturing of AZ31 Magnesium Alloy", Proceedings of the SPIE, vol. 12312, Dec. 19, 2022, 15 pages.

Gao et al., "Defect elimination and microstructure improvement of laser powder bed fusion β-solidifying γ-TiAl alloys via circular beam oscillation technology", Materials Science, Elsevier, Amsterdam, vol. 873, Apr. 1, 2023 (Abstract Only).

* cited by examiner

ADDITIVE MANUFACTURING METHODS AND SYSTEMS

FIELD

The present disclosure relates to additive manufacturing methods and systems, such as additive manufacturing methods and systems to build thin walls.

BACKGROUND

Three-dimensional objects may be additively manufactured using a variety of methods and systems. For example, additive manufacturing may involve a powder bed fusion process in which one or more energy beams are directed onto a powder bed to melt, fuse, or sinter sequential layers of build material such as powder material. The properties of the three-dimensional object formed by consolidating the powder material depend, at least in part, on one or more parameters of the energy beam. Additionally, one or more parameters of an energy beam impact operating parameters such as processing speed of the additive manufacturing process.

In some additive manufacturing systems, one or more walls may be built using one or more energy beams. For example, a wall is built by consolidating outer edges of the wall with one or more passes by one or more energy beams. The internal portion of the wall can further be consolidated by using additional passes parallel to the edges or by using a distinct hatching pattern to otherwise fill the interior of the wall. The one or more additively manufactured walls can include structures that define, for example, an outer surface or an internal feature of the three-dimensional object, or even provide a lattice support structure to the interior of the three-dimensional object.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, an electron beam melting (EBM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, or precursors for ultra-high-temperature ceramics, such as polymeric precursors. Each successive layer may be, for example, between about 10 μm and 200 μm, although the thickness may be determined based on any number of parameters and may be any suitable size. Moreover, the additive manufacturing process described herein may be used for forming any type of suitable component. For example, the component formed using the additive manufacturing process described herein may comprise one or more turbine components such as turbine blades, shrouds, nozzles, heat shields, or vanes.

As used herein, the term "build plane" refers to a plane defined by a surface upon which an energy beam impinges to selectively irradiate and thereby consolidate powder material during an additive manufacturing process. Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

As used herein, the term "consolidate" or "consolidating" refers to solidification of build material (e.g., powder material) as a result of irradiating the build material, including by way of melting, fusing, sintering, or the like such that multiple separate pieces of build material (e.g., multiple individual pieces of powder material) join together into a single structure.

As used herein, the term "unconsolidated" refers to separate pieces of material than are not bonded or otherwise joined to one another, such as separate pieces of loose powder.

It is also understood that terms such as "top", "bottom", "outward", "inward", and the like are words of convenience and are not to be construed as limiting terms.

As used herein, the terms "first", "second", and "third" may be used interchangeably to distinguish one component from another and are not intended to signify location or importance of the individual components.

The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure is generally related to additive manufacturing methods and systems to build thin walls for three-dimensional objects. One or more energy beams in such systems can be used to build walls to define, for example, an outer surface, an internal feature, or an internal support lattice of a three-dimensional object. However, the minimal obtainable thickness of the wall may be inhibited by requiring multiple passes of an energy beam. Moreover, the uniformity of the consolidated build material within the wall may be inhibited when utilizing multiple passes or multiple energy beams.

Accordingly, alternative additive manufacturing methods and systems would be welcomed in the art, including additive manufacturing methods and systems that provide thin walls using energy beam oscillations.

Figure 1:
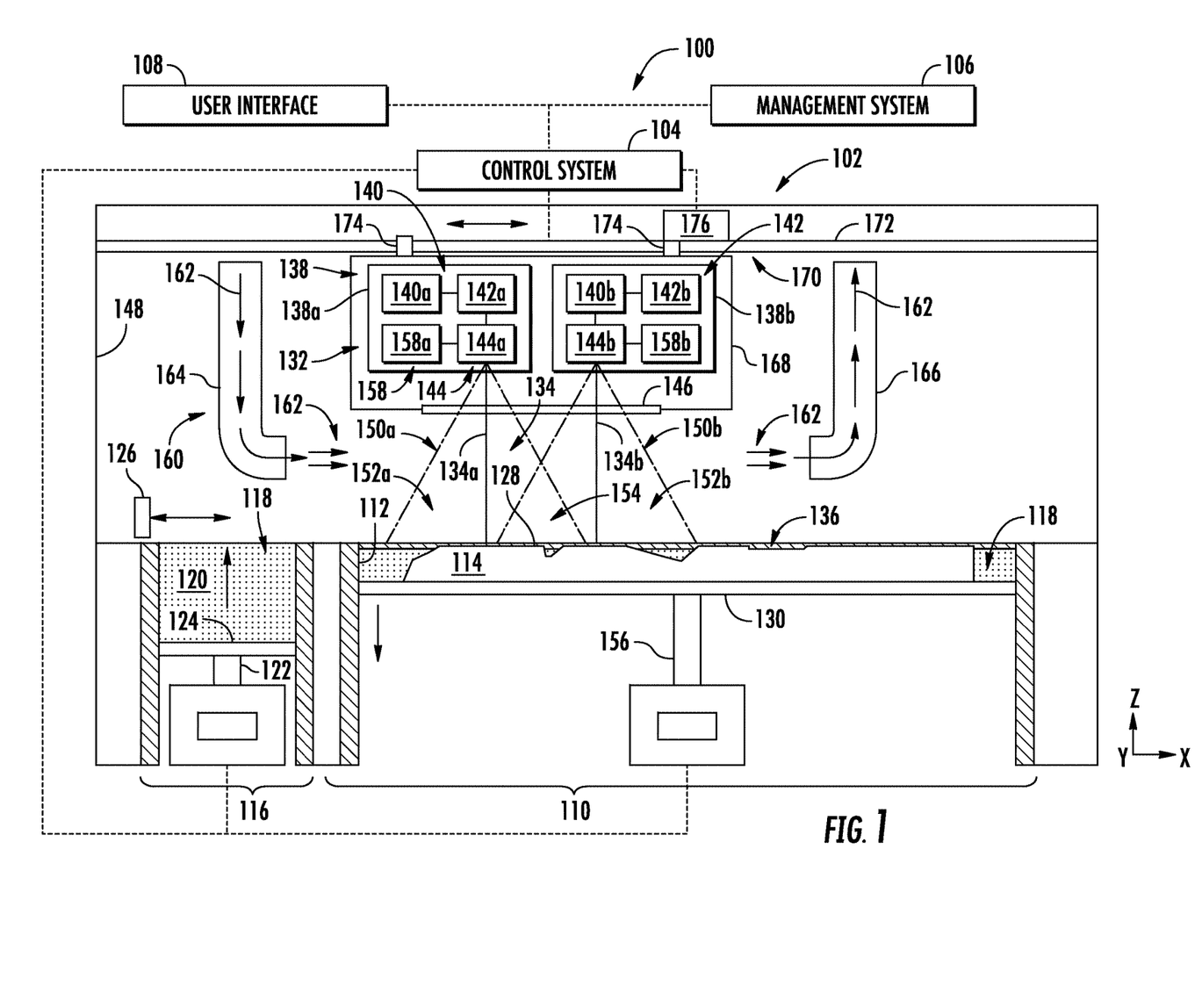
FIG. 1 schematically depicts an exemplary additive manufacturing system in accordance with one or more exemplary aspects of the present disclosure.

The presently disclosed subject matter will now be described in further detail. FIG. 1 schematically depicts an additive manufacturing system 100. The additive manufacturing system 100 may include one or more additive manufacturing machines 102. It will be appreciated that the additive manufacturing system 100 and additive manufacturing machine 102 shown in FIG. 1 is provided by way of example and not to be limiting. In fact, the subject matter of the present disclosure may be practiced with any additive manufacturing system 100 and additive manufacturing machine 102 without departing from the scope of the present disclosure. As shown, the one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 or componentry that is provided separately from the additive manufacturing machine 102. Various componentry of the control system 104 may be communicatively coupled to various componentry of the additive manufacturing machine 102.

The control system 104 may be communicatively coupled with a management system 106 or a user interface 108. The management system 106 may be configured to interact with the control system 104 in connection with enterprise-level operations pertaining to the additive manufacturing system 100. Such enterprise level operations may include transmitting data from the management system 106 to the control system 104 or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or three-dimensional objects 114 may be additively manufactured. An additive manufacturing machine 102 may include a powder module 116 that contains a supply of build material 118 (e.g., powder material) housed within a supply chamber 120. The build module 110 or the powder module 116 may be provided in the form of modular containers configured to be installed into and removed from the additive manufacturing machine 102 such as in an assembly-line process. Additionally, or in the alternative, the build module 110 or the powder module 116 may define a fixed componentry of the additive manufacturing machine 102.

The powder module 116 contains a supply of build material 118 housed within a supply chamber 120. The powder module 116 includes a powder piston 122 that elevates a powder floor 124 during operation of the additive manufacturing machine 102. As the powder floor 124 elevates, a portion of the build material 118 is forced out of the powder module 116. A recoater 126 such as a blade or roller sequentially distributes thin layers of build material 118 across a build plane 128 above the build module 110. A build platform 130 supports the sequential layers of build material 118 distributed across the build plane 128. A build platform 130 may include a build plate (not shown) secured thereto and upon which a three-dimensional object 114 may be additively manufactured.

The additive manufacturing machine 102 includes an energy beam system 132 configured to generate one or more energy beams 134 and to direct the energy beams 134 onto the build plane 128 to selectively solidify respective portions of the powder bed 136 defining the build plane 128. The energy beams 134 may be laser beams or beams from any other suitable energy source, such as LEDs or other light sources, and so forth. As the energy beams 134 selectively melt or fuse the sequential layers of build material 118 that define the powder bed 136, the three-dimensional object 114 begins to take shape. The one or more energy beams 134 or laser beams may include electromagnetic radiation having any suitable wavelength or wavelength range, such as a wavelength or wavelength range corresponding to infrared light, visible light, or ultraviolet light, or a combination thereof.

Typically, with a DMLM, EBM, or SLM system, the build material 118 is fully melted, with respective layers being melted or re-melted with respective passes of the energy beams 134. With DMLS or SLS systems, typically the layers of build material 118 are sintered, fusing particles of build material 118 to one another generally without reaching the melting point of the build material 118. The energy beam system 132 may include componentry integrated as part of the additive manufacturing machine 102 or componentry that is provided separately from the additive manufacturing machine 102.

The energy beam system 132 may include one or more irradiation devices 138 configured to generate a plurality of energy beams 134 and to direct the energy beams upon the build plane 128. An energy beam system 132 may include a plurality of irradiation devices 138, such as a first irradiation device 138a and a second irradiation device 138b. The one or more irradiation devices 138 may respectively include an energy beam source 140 (e.g., first energy beam source 140a and second energy beam source 140b), an optical assembly 142 (e.g., first optical assembly 142a and second optical assembly 142b), and a scanner 144 (e.g., first scanner 144a and second scanner 144b). The optical assembly 142 may include a plurality of optical elements configured to direct the energy beam onto the build plane 128. The optical assembly 142 may include one or more optical elements, such as lenses through which an energy beam may be transmitted along an optical path from the energy beam source to the build plane. By way of example, an optical assembly 142 may include one more focusing lenses that focus an energy beam 134 on a build plane 128. A scanner 144 may include a galvo scanner, an electro-optic modulator, an acousto-optic modulator, a piezo-driven mirror, or the like. Additionally, or in the alternative, the energy beam system 132 may include a window 146, such as a protective glass, that separates one or more components of the energy beam system 132 from the environment of a process chamber 148 within which build material 118 is irradiated by the one or more energy beams 134 to additively manufacture a three-dimensional object 114.

The window 146 may prevent contaminants from fumes associated with the additive manufacturing process, such as powder material, dust, soot, residues, vapor, byproducts, and the like, from coming into contact with sensitive components of an energy beam system 132. Accumulation of contaminants upon various optical elements of an optical assembly 142 may adversely affect operation of the energy beam system 132 or quality metrics associated with an energy beam system. Additionally, or in the alternative, such contaminants may cause damage to various optical elements of an optical assembly 142.

As shown in FIG. 1, the energy beam system 132 includes a first irradiation device 138a and a second irradiation device 138b. Additionally, or in the alternative, an energy beam system 132 may include any number of additional irradiation devices such as three, four, six, eight, ten, or more irradiation devices, and such irradiation devices may respectively include an optical assembly 142. The plurality of irradiation devices 138 may be configured to respectively generate one or more energy beams that are respectively scannable within a scan field incident upon at least a portion of the build plane 128 to selectively consolidate the portions of the build material 118 that are to become part of the three-dimensional object 114.

For example, the first irradiation device 138a may generate a first energy beam 134a that is scannable within a first scan field 150a incident upon at least a first build plane region 152a. The second irradiation device 138b may generate a second energy beam 134b that is scannable within a second scan field 150b incident upon at least a second build plane region 152b. The first scan field 150a and the second scan field 150b may overlap such that the first build plane region 152a scannable by the first energy beam 134a overlaps with the second build plane region 152b scannable by the second energy beam 134b. The overlapping portion of the first build plane region 152a and the second build plane region 152b may sometimes be referred to as an interlace region 154. Portions of the powder bed 136 to be irradiated within the interlace region 154 may be irradiated by the first energy beam 134a, or the second energy beam 134b, or a combination thereof. While the powder bed 136 to be irradiated is exemplary illustrated as being irradiated by the first energy beam 134a or the second energy beam 134b, it is appreciated that any number of energy beams 134 may additionally or alternatively be utilized for irradiating the build plane 128 in accordance with the present disclosure.

To irradiate a layer of the powder bed 136, the one or more irradiation devices 138 (e.g., the first irradiation device 138a and the second irradiation device 138b) respectively direct the plurality of energy beams 134 beams (e.g., the first energy beam 134a and the second energy beam 134b) across the respective portions of the build plane 128 (e.g., the first build plane region 152a and the second build plane region 152b) to selectively consolidate the portions of the build material 118 that are to become part of the three-dimensional object 114. The one or more energy beams 134 may become incident upon the build plane 128 defined by the powder bed 136, for example, after passing through one or more optical elements of the optical assembly 142 or through a window 146 of the energy beam system 132. As sequential layers of the powder bed 136 are consolidated, a build piston 156 gradually lowers the build platform 130 to make room for sequential layers of build material 118. As sequential layers of build material 118 are applied across the build plane 128, the next sequential layer of build material 118 defines the surface of the powder bed 136 coinciding with the build plane 128. Sequential layers of the powder bed 136 may be selectively consolidated until a completed object 114 has been additively manufactured. In some aspects of the disclosure, an additive manufacturing machine may utilize an overflow module (not shown) to capture excess build material 118. Additionally, or in the alternative, excess build material 118 may be redistributed across the build plane 128 when applying a next sequential layer of build material 118. It will be appreciated that other systems may be provided for handling the build material 118, including different powder supply systems or excess powder recapture systems. The subject matter of the present disclosure may be practiced with any suitable additive manufacturing machine without departing from the scope hereof.

Still referring to FIG. 1, an additive manufacturing machine 102 may include an imaging system 158 (e.g., first imaging system 158a and second imaging system 158b) configured to monitor one or more operating parameters of an additive manufacturing machine 102, one or more parameters of an energy beam system 132, or one or more operating parameters of an additive manufacturing process. The imaging system may have a calibration system configured to calibrate one or more operating parameters of an additive manufacturing machine 102 or of an additive manufacturing process. The imaging system 158 may be a melt pool monitoring system. The one or more operating parameters of the additive manufacturing process may include operating parameters associated with additively manufacturing a three-dimensional object 114. The imaging system 158 may be configured to detect an imaging beam such as an infrared beam from a laser diode or a reflected portion of an energy beam (e.g., a first energy beam 134a or a second energy beam 134b).

An energy beam system 132 or an imaging system 158 may include one or more detection devices. The one or more detection devices may be configured to determine one or more parameters of an energy beam system 132, such as one or more parameters associated with irradiating the sequential layers of the powder bed 136 based at least in part on an assessment beam detected by the imaging system 158. One or more parameters associated with consolidating the sequential layers of the powder bed 136 may include irradiation parameters or object parameters, such as melt pool monitoring parameters. The one or more parameters determined by the imaging system 158 may be utilized, for example, by the control system 104, to control one or more operations of the additive manufacturing machine 102 or of the additive manufacturing system 100. The one or more detection devices may be configured to obtain assessment data of the build plane 128 from a respective assessment beam. An exemplary detection device may include a camera, an image sensor, a photo diode assembly, or the like. For example, a detection device may include charge-coupled device (e.g., a CCD sensor), an active-pixel sensor (e.g., a complementary metal-oxide semiconductor (CMOS) sensor), a quanta image device (e.g., a QIS sensor), or the like. A detection device may additionally include a lens assembly configured to focus an assessment beam along a beam path to the detection device. An imaging system 158 may include one or more imaging optical elements (not shown), such as mirrors, beam splitters, lenses, and the like, configured to direct an assessment beam to a corresponding detection device.

In addition, or in the alternative, to determine parameters associated with irradiation the sequential layers of the powder bed 136, the imaging system 158 may be configured to perform one or more calibration operations associated with an additive manufacturing machine 102, such as a calibration operation associated with the energy beam system 132, one or more irradiation devices 138 or components thereof, or the imaging system 158 or components thereof. The imaging system 158 may be configured to project an assessment beam and to detect a portion of the assessment beam reflected from the build plane 128. The assessment beam may be projected by an irradiation device 138 or a separate beam source associated with the imaging system 158. Additionally, or in the alternative, the imaging system 158 may be configured to detect an assessment beam that includes radiation emitted from the build plane 128, such as radiation from an energy beam 134 reflected from the powder bed 136 or radiation emitted from a melt pool in the powder bed 136 generated by an energy beam 134 or radiation emitted from a portion of the powder bed 136 adjacent to the melt pool. The imaging system 158 may include componentry integrated as part of the additive manufacturing machine 102 or componentry that is provided separately from the additive manufacturing machine 102. For example, the imaging system 158 may include componentry integrated as part of the energy beam system 132. Additionally, or in the alternative, the imaging system 158 may include separate componentry, such as in the form of an assembly, that can be installed as part of the energy beam system 132 or as part of the additive manufacturing machine 102.

Still referring to FIG. 1, in some aspects of the disclosure, an inertization system 160 may supply a flow of inert process gas 162 to one or more regions the process chamber 148, such as a region between the energy beam system 132 and the powder bed 136. The flow of inert process gas 162 may remove fumes from the process chamber 148 or to reduce the tendency of fumes to interfere with the energy beams 134 used to irradiate the build material 118. Such fumes may present in the form of a plume emanating from a consolidation zone where an energy beam 134 becomes incident upon the powder bed 136 and may sometimes be referred to as a fume plume. A fume plume may include build material, dust, soot, residues, vapors, byproducts, or the like. The flow if inert process gas 162 may also reduce the tendency of contaminants from fumes to deposit on the window 146, optical elements of the optical assembly 142, or other components of the energy beam system 132. The inertization system 160 may provide a directional flow of inert process gas 162 that flows across the build plane 128. For example, as shown, the inert process gas 162 flows from left to right. The inertization system 160 may include a supply manifold 164 and a return manifold 166. The inert process gas 162 may flow from the supply manifold 164 to the return manifold 166. Fumes in the process chamber 148 may be drawn into the return manifold 166. In some aspects of the disclosure, the supply manifold 164 or the return manifold 166 may be coupled to, or define a portion of, a perimeter wall of the process chamber 148. Additionally, or in the alternative, the supply manifold 164 or the return manifold 166 may be coupled to a housing assembly 168 that contains one or more components of the energy beam system 132, such as one or more irradiation devices 138 and or one or more imaging systems 158. With the supply manifold 164 or the return manifold 166 coupled to the housing assembly 168, a relatively small volume of space between the energy beam system 132 and the powder bed 136 may be inertized, as opposed to inertizing an entire interior of the process chamber 148. Additionally, or in the alternative, a fume plume may have a shorter path to travel before being drawn into the return manifold 166 by the flow of inert process gas 162.

The energy beam system 132 may be positioned at any suitable location within the process chamber 148. Additionally, or in the alternative, the energy beam system 132 may be coupled to a perimeter wall of the process chamber 148. In some aspects of the disclosure, an additive manufacturing machine may include a positioning system 170 configured to move an energy beam system 132 or one or more components thereof relative to the build plane 128. The positioning system 170 may be configured to move the energy beam system 132 or one or more components thereof to specified build coordinates or along specified build vectors corresponding to a cartesian coordinate system in accordance with control commands provided, for example, by the control system 104. The control commands may be provided, for example, to carry out operations of the one or more energy beam system 132 or of the additive manufacturing machine 102 in accordance with the present disclosure. The positioning system 170 may include one or more gantry elements 172 configured to move the energy beam system 132 or one or more components thereof across the powder bed. The gantry elements 172 may respectively be configured to move the energy beam system 132 or one or more components thereof in one or more directions, such as an X-direction, a Y-direction, or a Z-direction. In some aspects of the disclosure, the positioning system 170 may be coupled to the housing assembly 168 that contains one or more components of the energy beam system 132. The housing assembly 168 may be coupled to one or more gantry elements 172 by one or more gantry mounts 174. The positioning system 170 may include a drive motor 176 configured to move the housing assembly 168 or the one or more components the energy beam system 132 according to instructions for the control system 104. The positioning system 170 may include componentry typically associated with a gantry system, such as stepper motors, drive elements, carriages, and so forth.

Figure 2:
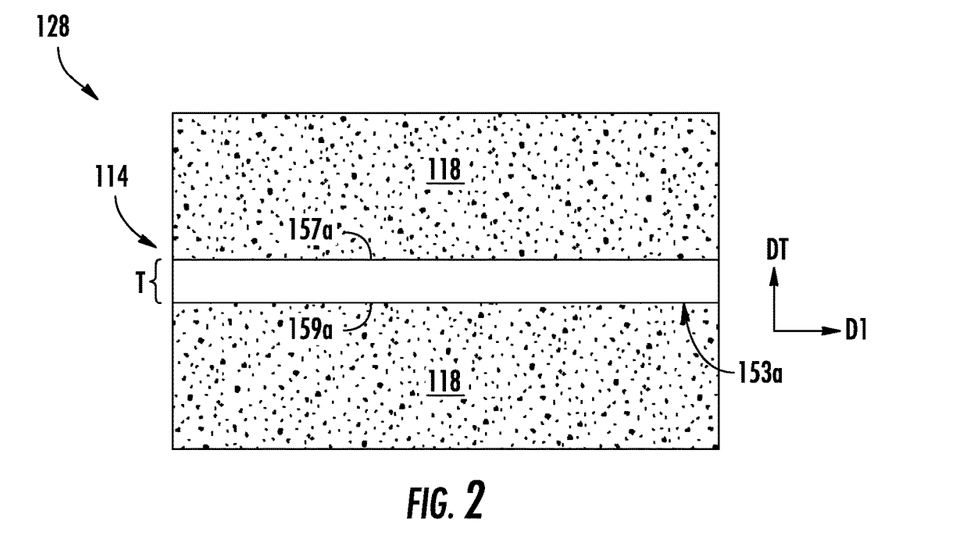
FIG. 2 schematically depicts a build plane in accordance with one or more exemplary aspects of the present disclosure.

Referring now additionally to FIG. 2, a top down view of a build plane 128 is illustrated for forming a first wall 153a of the three-dimensional object 114. The first wall 153a can generally refer to any thin or narrow structure consolidated by one or more energy beams 134 (not shown in FIG. 2). The first wall 153a extends in a first direction D1 and can be defined by a first side 157a of the first wall 153a and a second side 159a of the first wall 153a, wherein the second side 159a is opposite the first side 157a. Build material 118 adjacent the first side 157a of the first wall 153a and adjacent the second side 159a of the first wall 153a remains unconsolidated. That is, the build material 118 adjacent the first wall 153a remains in its form (e.g., loose powder material) when applying the build material 118 to the build plane 128.

The first wall 153a may comprise a variety of configurations and orientations. For example, the first wall 153a may comprise a generally linear orientation such as illustrated in FIG. 2. In some aspects of the disclosure, the first wall 153a may comprise a non-linear orientation such that it includes one or more bends, turns, curves or the like. Further, the first wall 153a comprises a thickness T in the thickness direction DT which is perpendicular to the first direction D1 (that is, the distance between the first side 157a of the first wall 153a and the second side 159a of the first wall 153a). In some aspects of the disclosure, the first wall 153a may comprise a substantially uniform thickness T as it extends in the first direction D1. However, in some aspects of the disclosure, the thickness T of the first wall 153a may increase or decrease at one or more locations along the first direction D1.

Further, while FIG. 2 illustrates a first wall 153a in isolation within the build plane 128, it is appreciated that other structures may also be consolidated in the build plane 128 at one or more locations. For example, the first wall 153a may extend between and connect to one or more larger structures separated by a defined distance. Alternatively, or additionally, the first wall 153a may intersect with additional structures in the build plane 128.

Figure 3:
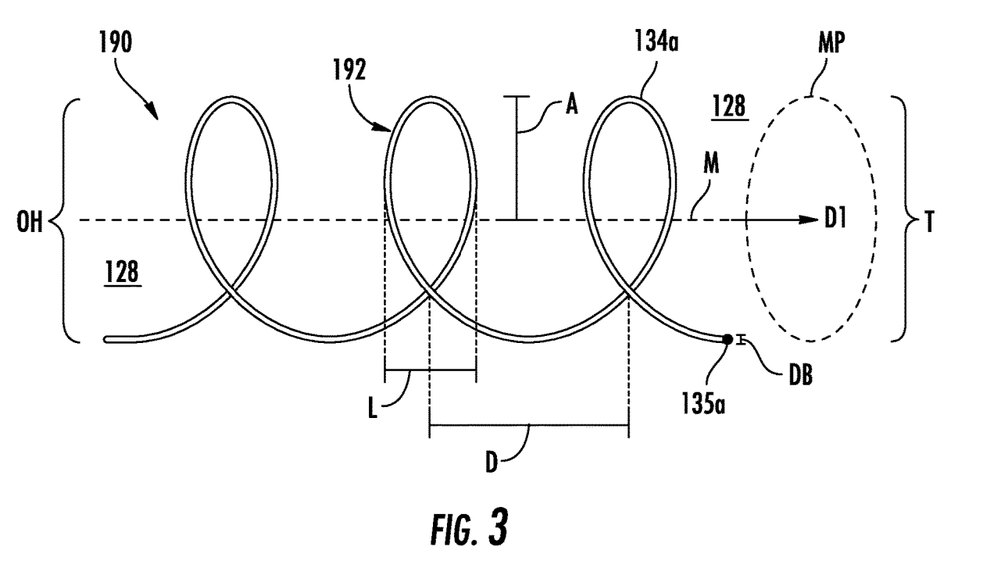
FIG. 3 schematically depicts an oscillation of an energy beam in accordance with one or more exemplary aspects of the present disclosure.

Referring now additionally to FIG. 3, a top down view of a first oscillating path 190 is illustrated for consolidating the first wall 153a illustrated in FIG. 2. The first oscillating path 190 generally comprises a plurality of oscillations 192 that repeat along a first direction D1. That is, the first spot 135a of the first energy beam 134a can wobble as it travels across the build plane 128 in the first direction D1 to produce the plurality of oscillations 192. The wobbling of the first energy beam 134a can allow for a larger melt pool in the build plane 128 than if the first spot 135a were to merely travel linearly in parallel with the first direction D1. For instance, the first spot 135a comprises a beam diameter DB defining the diameter of the first spot 135a on the build plane 128. The melt pool MP formed in the build plane 128 by the plurality of oscillations 192 can exceed the size of the beam diameter DB to consolidate a larger area via a single pass or fewer passes. For example, due in part to the plurality of oscillations 192, the thickness T of the first wall 153a can be greater than the beam diameter DB. In some aspects of the disclosure, the thickness T of the first wall 153a may be between 1.5 times and seven times the beam diameter DB of the first energy beam 134a. In some aspects of the disclosure, the thickness T of the first wall 153a may be between two times and five times the beam diameter DB of the first energy beam 134a. In some aspects of the disclosure, the thickness T of the first wall 153a may be between two times and three times the beam diameter DB of the first energy beam 134a.

The first oscillating path 190 can comprise a variety of parameters and configurations including with respect to the plurality of oscillations 192. For instance, each oscillation 192 may generally comprise an amplitude A and a length L. The amplitude A refers to the maximum distance reached by the first spot 135a extending away from a midline M which bisects the first oscillating path 190 in the first direction D1D1. The length L refers to the distance extending in the first direction D1D1 of each oscillation 192. Moreover, the first oscillating path 190 can comprise a distance D between oscillations 192.

The amplitude A of each oscillation 192 may impact the size of the overall melt pool, which can have a diameter the same as or similar to the overall oscillation height OH. For instance, a greater amplitude can create a greater melt pool size which will, in turn, lead to the consolidation of larger amount of build material 118 (FIGS. 1 and 2) in the build plane 128 from a single pass of the first energy beam 134a. The length L of each oscillation 192 may impact the amount of energy imparted on the build material 118 (FIGS. 1 and 2) in the build plane 128 from the first energy beam 134a by adjusting the amount of distance travelled by the first spot 135a of the first energy beam 134a over any particular area. A smaller length L can produce a greater travel distance of the first spot 135a over a smaller area along the direction of travel to increase the overall amount of energy imparted on the build material 118 (FIGS. 1 and 2). Further, the frequency of oscillations 192 in the first oscillating path 190 can be tailored by adjusting the distance D between oscillations 192. A smaller distance D results in oscillations that are more frequent which in turn, similar to a smaller length L, can produce a greater travel distance of the first spot 135a over a smaller area along the travel direction D1 to increase the overall amount of energy imparted on the build material 118 (FIGS. 1 and 2). The length L and distance D parameters may be adjusted to any suitable values that produce a suitable melt pool in the build plane 128. In some aspects of the disclosure, such as that illustrated in FIG. 3, the oscillations 192 may be separated from one another. However, in some aspects of the disclosure, the length L may be large enough or the distance D may be small enough that the oscillations 192 may partially overlap with one another along the travel direction T.

In some aspects of the disclosure, the amplitude A, length L, and distance D for each oscillation 192 can each remain constant along the first oscillating path 190. However, in some aspects of the disclosure, one or more of the amplitude A, length L, and distance D can independently vary along the first oscillating path 190 within oscillations 192. For example, the amplitude A may increase for certain oscillations over a certain distance to temporarily grow the size of the melt pool with respect to the first oscillating path 190.

The oscillations 192 may comprise a variety of configurations. In some aspects of the disclosure, such as that illustrated in FIG. 3, the oscillations 192 may comprise symmetrical loops. In some aspects of the disclosure, one or more of the oscillations 192 may additionally or alternatively comprise other configurations, such as asymmetrical loops, linear or non-linear patterns, or combinations thereof. Moreover, while the first direction D1 is illustrated as comprising a relatively linear path, it is appreciated that the first direction D1 may additionally, or alternatively, comprise one or more non-linear portions such as bends, curves, turns, or the like.

Figure 4:
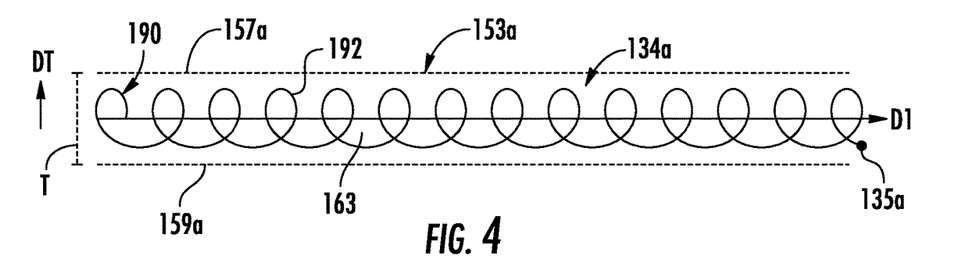
FIG. 4 schematically depicts an energy beam having a first oscillating path forming a first wall in accordance with one or more exemplary aspects of the present disclosure.

Referring now additionally to FIG. 4, the plurality of oscillations 192 of the first oscillating path 190 can irradiate the build material 118 (FIGS. 1 and 2) to consolidate at least a portion of the first wall 153a. Moreover, the plurality of oscillations 192 may define at least the first side 157a of the first wall 153a by irradiating and consolidating the build material 118 at the edge of the first wall 153a without the need for additional irradiation or passes from energy beams 134 (not shown). The irradiation imparted by the first spot 135a of the first energy beam 134a at the peak amplitude A of each oscillation 192 will thereby cause the first side 157a and the second side 159a of the first wall 153a to be consolidated to define the same. That is, the amplitude A will control the maximum dimension of the melt pool, which, in turn, becomes the outer surface of the first side 157a and the second side 159a of the first wall 153a. Thus, a constant amplitude A will produce a linear first side 157a and second side 159a of the first wall 153a. However, a varying amplitude A will produce a wall 153a having a first side 157a or second side 159a that is nonlinear such as expanding and retracting in the direction of the thickness direction DT. Such aspects of the disclosure can allow for relatively thin-walled structures to be built for three-dimensional objects 114 with higher efficiency, precision, and uniformity compared to additively manufacturing walls using non-oscillating laser paths.

The body portion 163 of the first wall 153a, i.e., the portion between the first side 157a of the first wall 153a and the second side 159a of the first wall 153a, can be consolidated using the rest of the oscillating path 190. Such aspects of the disclosure can avoid the need for hatching (e.g., a plurality of linear passes by one or more energy beams 134) to help speed up the manufacturing process and avoid potential solidification inconsistencies that could occur from multiple adjacent passes.

In some aspects of the disclosure, the plurality of oscillations 192 may further define the second side 159a of the first wall 153a by irradiating and consolidating the build material 118 at the other edge of the first wall 153a without the need for additional irradiation or passes from energy beams 134. The irradiation imparted by the first spot 135a of the first energy beam 134a at the peak amplitude A of each oscillation 192 will thereby also cause the second side 159a of the first wall 153a to be consolidated to define the same. Such aspects of the disclosure can allow for a single pass of the first energy beam 134a on the first oscillating path 190 to define the entirety of the first wall 153a.

Figure 5:
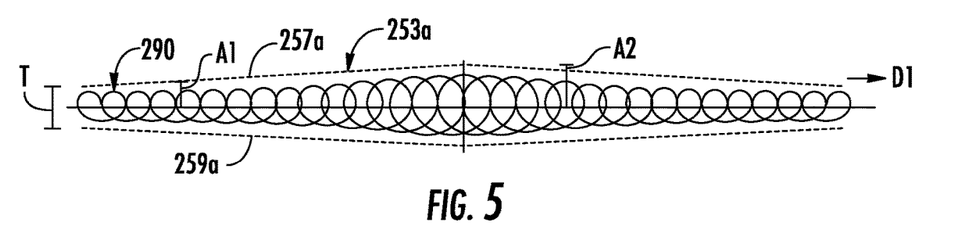
FIG. 5 schematically depicts an energy beam having a first oscillating path with variations forming another first wall in accordance with one or more exemplary aspects of the present disclosure.

FIG. 5 illustrates another first oscillating path 290 according to another aspect of the disclosure. The first oscillating path 290 is similar to first oscillating path 190; therefore, like components will be identified with like numerals increased by 100, with it being understood that the description of the like parts of the first oscillating path 190 applies to the first oscillating path 290, unless otherwise noted. As illustrated in FIG. 5, one or more dimensions of the first oscillating path 290 are varied as the first energy beam 134a (FIG. 1) travels in the first direction D1. For example, as illustrated in FIG. 5, the amplitude A of the first oscillating path 290 may vary as the first oscillating path travels in the first direction D1. In such aspects of the disclosure, the first oscillating path may comprise at least a first amplitude A1 at a first location and a second amplitude A2 at a second location further along in the first direction D1. The second amplitude A2 can be greater than the first amplitude A1 such that a thickness T of the first wall 253a between the first side 257a and the second side 259a) can increase along a first portion of the first wall 253a. Depending on the design of the first wall 253a and the three-dimensional object 114, the amplitude A can vary (e.g., increase or decrease) at a single location or at a plurality of locations. Moreover, the amplitude A may steadily vary (e.g., a tapered increase or tapered decrease) or may quickly vary (e.g., an immediate increase or immediate decrease), or a combination thereof as the first oscillating path 190 extends in the first direction D1. Further, a power of the first energy beam can be adjusted when the plurality of oscillations is varied, such as by increasing or decreasing the power when the amplitude A is increased or decreased.

The first energy beam 134a (FIG. 1) may comprise a variety of beam parameters along the first oscillating path such as, but not limited to, power, spot size, focus depth, travel speed, and other beam parameters for sufficient consolidation of build material 118. Similar to the amplitude A, the beam parameters of the first energy beam 134a may remain constant throughout the entire oscillating path 190, or may vary in whole or in part throughout the oscillating path 190.

Figure 6:
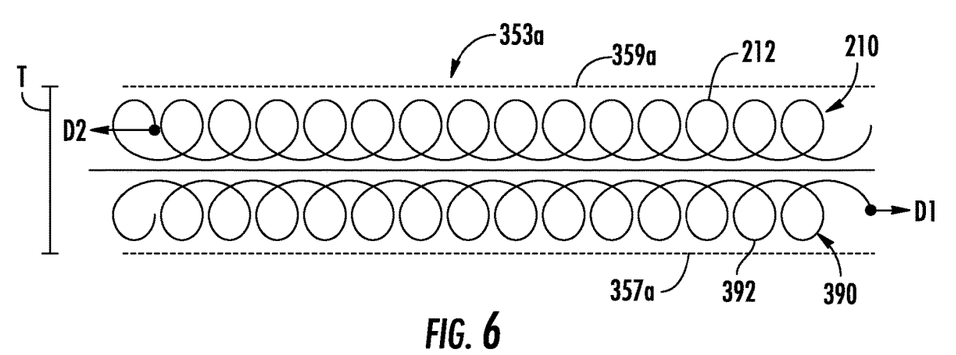
FIG. 6 schematically depicts an energy beam having multiple oscillating paths forming yet another first wall in accordance with one or more exemplary aspects of the present disclosure.

FIG. 6 illustrates another first oscillating path 390 according to another aspect of the disclosure. The first oscillating path 390 is similar to first oscillating path 190; therefore, like components will be identified with like numerals increased by 100, with it being understood that the description of the like parts of the first oscillating path 190 applies to the first oscillating path 290, unless otherwise noted. As illustrated in FIG. 6, the first wall 353a may be consolidated using additional irradiation such as additional passes by the first energy beam 134a (FIG. 1) or additional passes by the second energy beam 134b (FIG. 1). For example, with reference to FIG. 6, in some aspects of the disclosure, a second build plane region 152b (FIG. 1) may be irradiated along a second oscillating path 210 in a second direction D2 that is opposite the first direction D1 to consolidate the first wall 353a. The second oscillating path 210 can comprise a plurality of oscillations 212 that define the second side 359a of the first wall 353a, which is opposite the first side 357a of the first wall 352a to collectively define the thickness T of the first wall 352a. As such, the first oscillating path 390 and the second oscillating path 210 may traverse adjacent and substantially parallel to one another to consolidate the first wall 353a. While exemplary illustration is made to the first energy beam 134a and the second energy beam 134b, it is appreciated that any number of energy beams 134 may additionally or alternatively be utilized for irradiating the build plane 128 in any number of regions.

In some aspects of the disclosure, the first energy beam 134a may travel both the first oscillating path 390 and the second oscillating path 210. Alternatively, in some aspects of the disclosure, the first energy beam 134a may travel the first oscillating path 390 and the second energy beam 134b may travel the second oscillating path 210. Moreover, the first oscillating path 390 and the second oscillating path 210 may generally comprise the same dimensions such as the same amplitude A, length L, or distance D (FIG. 3). In some aspects of the disclosure, one or more of the dimensions may vary between the first oscillating path 390 and the second oscillating path 210. Furthermore, the parameters of the energy beam 134 used for the first oscillating path 390 and the second oscillating path 210 may be similar to one another, dissimilar to one another, or a combination thereof.

Referring now to FIGS. 7-10, in some aspects of the disclosure, different oscillating paths may form adjacent portions parts of the same wall, wherein the different oscillating paths meet in an overlap space between the two adjacent portions. That is, for example, to form a wall running from right to left, one oscillating path forms the left half of the wall, another oscillating path forms the right half of the wall, and the two oscillating paths meet in an interlace region between the left half and right half of the wall. Exemplary aspects of the disclosure will be presented with reference to the individual figures, wherein like components will be identified with like numerals generally increased by 100, and with it being understood that the description of the like parts described herein carries forward unless otherwise noted.

Figure 7:
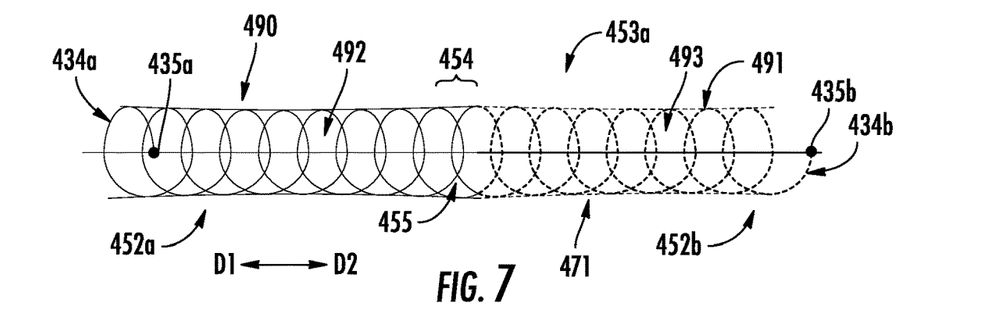
FIG. 7 schematically depicts multiple energy beams having multiple oscillating paths to form yet another first wall and an extension in accordance with one or more exemplary aspects of the present disclosure.

FIG. 7 illustrates a second build plane region 452b may be irradiated along a second oscillating path 491 in a second direction D2 that is opposite the first direction D1 to consolidate an extension 471 the first wall 453a. The first wall 453a and the extension 471 can overlap 455 in an interlace region 454.

The interlace region 454 can be consolidated using a combination of the first energy beam 434a and the second energy beam 434b to help promote build quality of the three-dimensional object 114 (FIG. 1) between the first build plane region 452a and the second build plane regions 452b despite the use of multiple energy beams 134 (FIG. 1). In combination, the first build plane region 452a (irradiated by the first energy beam 434a), the second build plane region 452b (irradiated by the second energy beam 434b), and the interlace region 454 (irradiated by both the first energy beam 434a and the second energy beam 434b) can comprise a variety of relative configurations.

For instance, the first oscillating path 490 of the first energy beam 134a and the second oscillating path 491 of the second energy beam 434b may combine and overlap 455 to irradiate the interlace region 454. The overlap 455 refers to the portion of the build plane 128 (FIG. 1) where both the first spot 435a of the first energy beam 434a and the second spot 435b of the second energy beam 434b irradiate the same build material 118 (FIG. 1). By at least partially overlapping the first oscillating path 490 and the second oscillating path 491, the interlace region 454 may be irradiated and consolidated in a more efficient manner and mitigate potential misalignment between the first energy beam 434a and the second energy beam 434b, such as by forming a larger common melt pool in the build material 118 (FIG. 1).

The interlace region 454 can comprise a variety of relative configurations for overlapping, tapering, or otherwise joining the first wall 453a with the extension 471. For example, in some aspects of the disclosure, such as that illustrated in FIG. 7, the first oscillating path 490 and the second oscillating path 491 may overlap 455 for a defined distance. The distance and amount of overlap may depend on, for example, the configurations of the first oscillating path 490 and the second oscillating path 491, or the parameters of the first energy beam 434a and the second energy beam 434b.

Figure 8:
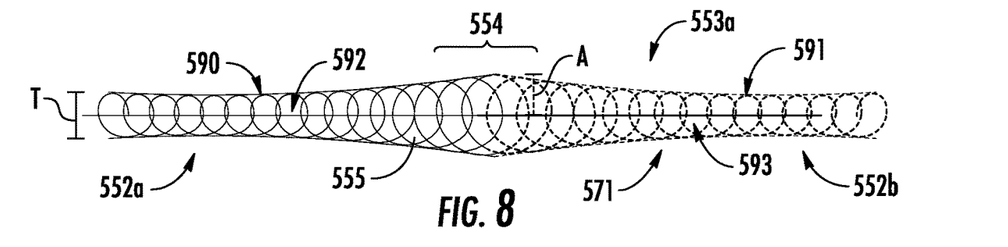
FIG. 8 schematically depicts multiple energy beams having multiple oscillating paths with variations to form yet another first wall and an extension in accordance with one or more exemplary aspects of the present disclosure.

FIG. 8 illustrates another embodiment of a first oscillating path 590 and a second oscillating path 591 forming a first wall 553a. In some aspects of the disclosure, such as that illustrated in FIG. 8, the amplitude A for at least one of the plurality of oscillations 592, 593 for the first oscillating path 590 and the second oscillating path 591 may vary in the interlace region 554. For example, the amplitude A may increase for the oscillations 592 of the first oscillating path 590 or the oscillations 593 of the second oscillating path 591 in the interlace region 554. As a result, the first wall 553a and the extension 571 will have a larger thickness T where they meet.

Figure 9:
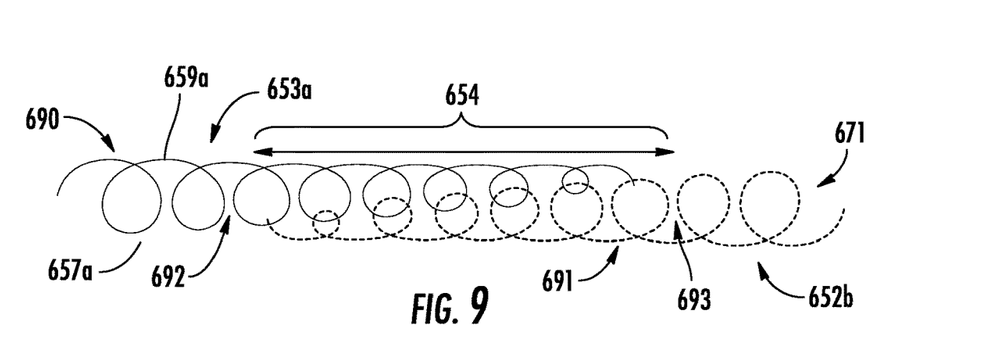
FIG. 9 schematically depicts multiple energy beams having multiple tapered oscillating paths to form yet another first wall and an extension in accordance with one or more exemplary aspects of the present disclosure.

FIG. 9 illustrates a first wall 653a, wherein the first plurality of oscillations 692 of the first oscillating path 690 may taper in the interlace region 654 such that the first oscillating path 190 reduces in amplitude A as it extends towards the extension 671 until stopping or diminishing. Alternatively, or additionally, the second plurality of oscillations 693 of the second oscillating path 691 may taper in the interlace region 654 such that the second oscillating path 691 reduces in amplitude A as it extends towards the first wall 653a until stopping or diminishing.

The tapering of the first oscillating path 690 or the second oscillating path 691 may be achieved with or without overlap. For example, with reference to FIG. 9, the oscillations 692 of the first oscillating path 690 may taper towards the first side 657a or the oscillations 693 of the second oscillating path 691 may taper towards the second side 659a. In such aspects of the disclosure, the first oscillating path 690 and the second oscillating path 691 may consolidate build material 118 (FIG. 1) in the interlace region 654 without overlap.

Figure 10:
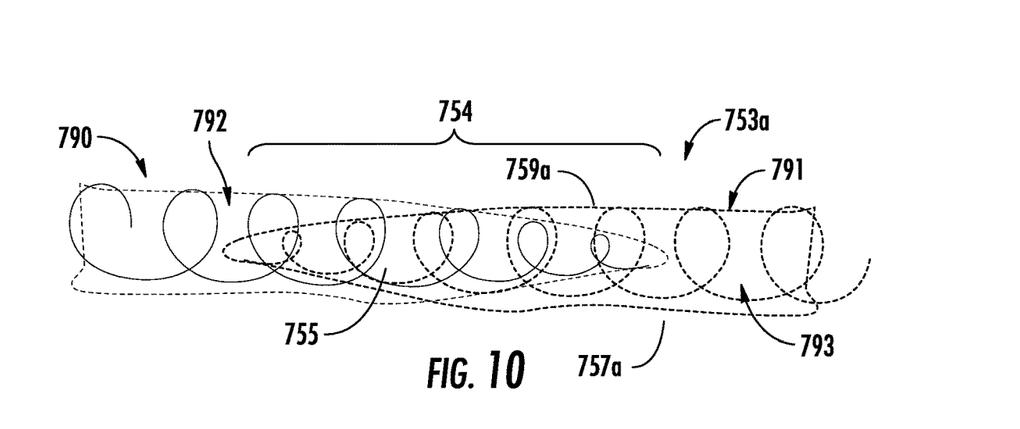
FIG. 10 schematically depicts multiple energy beams having multiple tapered oscillating paths to form yet another first wall and an extension in accordance with one or more exemplary aspects of the present disclosure.

FIG. 10 illustrates a first wall 753a, wherein the oscillations 792 of the first oscillating path 790 may taper towards the internal portion of the three-dimensional object 114 (i.e., between the first side 757a and the second side 759a) or the oscillations 793 of the second oscillating path 791 may taper towards the internal portion of the three-dimensional object 114 (FIG. 1). In such aspects of the disclosure, the first oscillating path 790 and the second oscillating path 791 may consolidate build material 118 (FIG. 1) in the interlace region 754 with overlap 755.

It is appreciated that while certain variations and permutations are presented herein with respect to the consolidation of the first wall 153a, the extension 171, and the interlace region 154, these examples are not intended to be exclusive and other implementations may further be realized within the scope of this disclosure.

Figure 11:
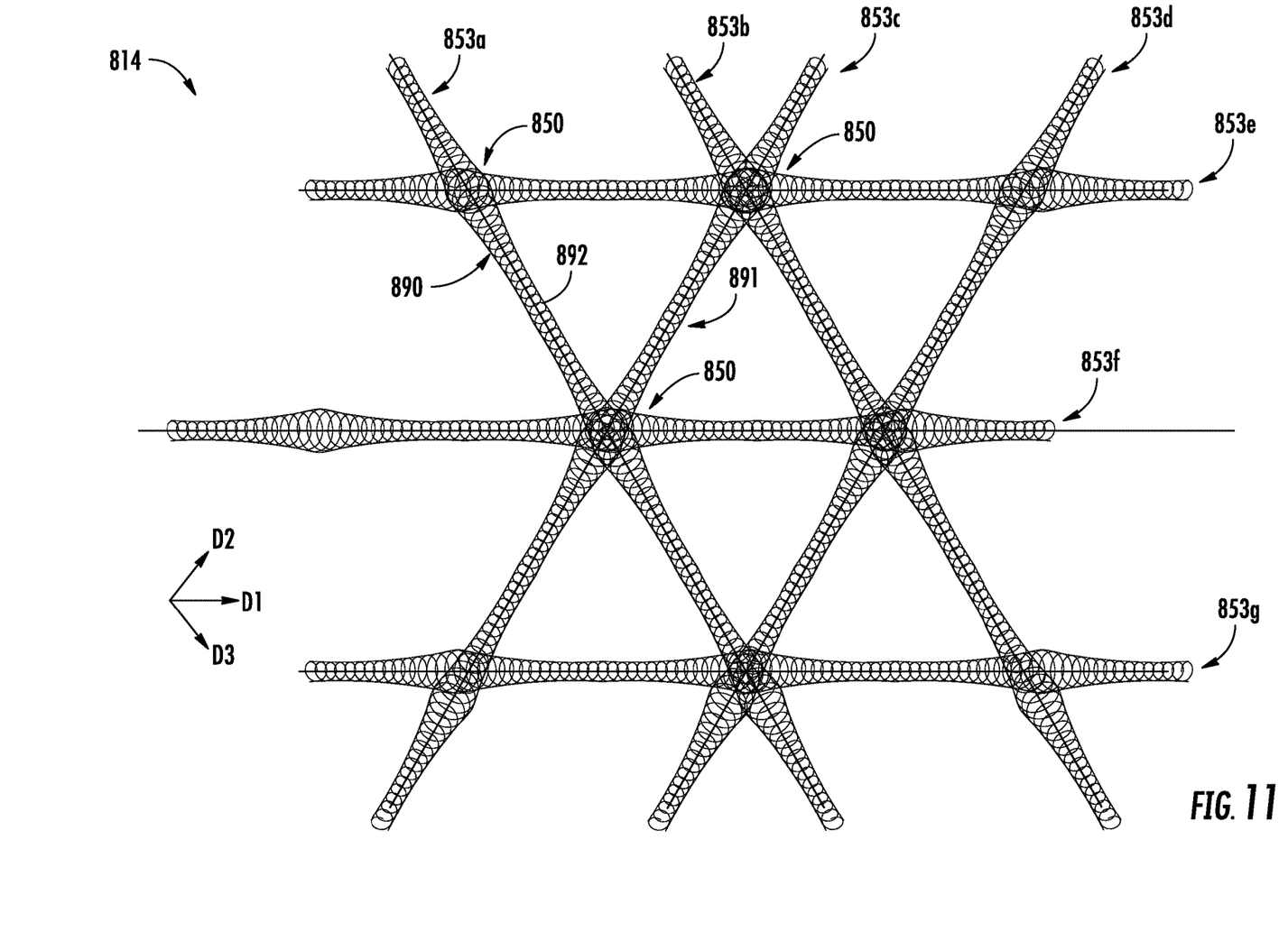
FIG. 11 schematically depicts a three-dimensional object having multiple intersecting walls in accordance with one or more exemplary aspects of the present disclosure.

Referring additionally to FIG. 11, in some aspects of the disclosure, the three-dimensional object 114 may have a plurality of walls 853 that cross at one or more intersections 850. While the three-dimensional object 814 presented in FIG. 11 illustrates the plurality of walls 853, it is appreciated that any of the earlier series numbering and aspects of the disclosure (153, 253, 353, 453, 552, 653, 753) can be included. As illustrated in FIG. 11, the three-dimensional object 814 may comprise a network of walls 853 that intersect at a plurality of intersections 850, wherein one or more of the walls 853 can be consolidated using the methods and systems disclosed herein. Such aspects of the disclosure can facilitate lattice-like support structures or represent a cross section of an interleaved thin-walled structure such as heat exchanges, flow chambers, or other design configurations suitable for additive manufacturing.

As illustrated in FIG. 11, for instance, the three-dimensional object 814 may comprise a first wall 853a, a second wall 853b, a third wall 853c, a fourth wall 853d, a fifth wall 853e, a sixth wall 853f, and a seventh wall 853g. The plurality of walls may comprise distinct sets of walls 853 that are parallel such as where the first wall 853a and the second wall 853b form a first parallel set, the third wall 853c and the fourth wall 853d form a second parallel set, and the fifth wall 853e, the sixth wall 853f, and the seventh wall 853g form a third parallel set. While FIG. 11 illustrates seven different walls 153 in three parallel sets, it is appreciated that the three-dimensional object 814 may comprise any number of walls 853 having any suitable configuration, with or without parallel orientations.

One or more of the walls 853 may comprise oscillations 892 such as via the first oscillating path 890, and the second oscillating path 891. For example, the first oscillating path 890 and the second oscillating path 891 may generally comprise the same dimensions such as the same amplitude A, length L, or distance D (FIG. 3). In some aspects of the disclosure, one or more of the dimensions may vary between the first oscillating path 890 and the second oscillating path 891. Furthermore, the parameters of the energy beam used for the first oscillating path 890 and the second oscillating path 891 may be similar to one another, dissimilar to one another, or a combination thereof. For example, in some aspects of the disclosure, the amplitude A of the oscillations 192 may increase for one or more of, or even each of, the walls 853 at the intersections 850. Such aspects of the disclosure may increase rigidity of the plurality of walls 853 within the three-dimensional object 814. Alternatively, or additionally, in some aspects of the disclosure, the amplitude A of the oscillations 892 may decrease for one or more of, or even each of, the walls 853 at the intersections 850.

Figure 12:
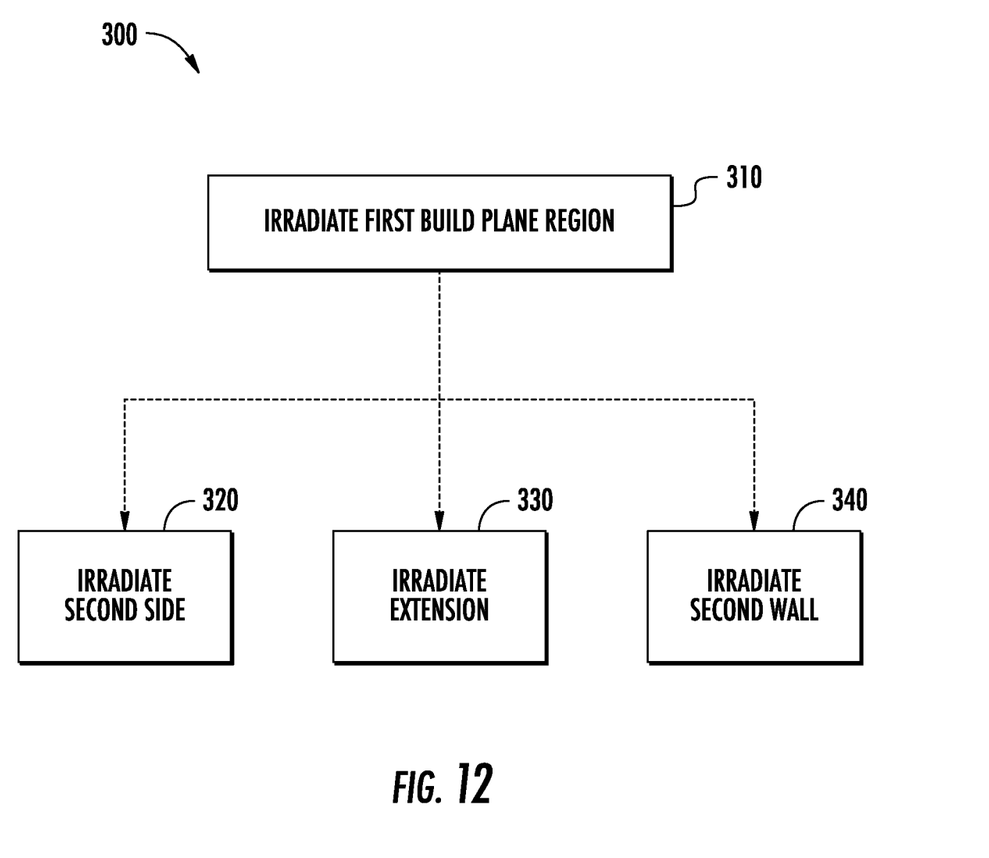
FIG. 12 schematically depicts an exemplary method of additively manufacturing a three-dimensional object in accordance with one or more exemplary aspects of the present disclosure.

Referring now additionally to FIG. 12, a method 300 is illustrated for additively manufacturing a three-dimensional object 114. While reference of the method 300 is generally made hereinafter to the exemplary aspects of the disclosure illustrated in FIGS. 2-4, it is appreciated that the method 300 also applies to the exemplary aspects of the disclosure included in FIGS. 5-11. The method 300 generally comprises irradiating a first build plane region 152a using a first energy beam 134a travelling along a first oscillating path 190 in a first direction D1 in step 310 to consolidate a first wall 153a, wherein a build material 118 adjacent a first side 157a of the first wall 153a and build material 118 adjacent a second side 159a of the first wall 153a, opposite the first side 157a of the first wall 153a, remains unconsolidated. The first oscillating path 190 can include a first plurality of oscillations 192 that define at least a first side 157a of the first wall 153a and a thickness T of the first wall 153a in a thickness direction DT, perpendicular to the first direction D1, can be greater than a beam diameter DB of the first energy beam 134a.

As discussed above, the three-dimensional object 114 may comprise a variety of relative parameters and configurations with respect to one or more walls 153 and their formation.

For example, the method 300 may include irradiating a second build plane region 152b along a second oscillating path 210 in a second direction D2 opposite the first direction D1 in step 320 to consolidate the first wall 153a. The second oscillating path 210 can include a second plurality of oscillations 212 that define a second side 159a of the first wall 153a opposite the first side 157a of the first wall 153a.

In some aspects of the disclosure, such as that illustrated in FIG. 7, the method 300 may include irradiating a second build plane region 452b along a second oscillating path 491 in a second direction D2 opposite the first direction D1 in step 330 to consolidate an extension 471 of the first wall 453a in the first direction D1. The second oscillating path 491 can include a second plurality of oscillations 493. Moreover, the first plurality of oscillations 492 and the second plurality of oscillations 493 can overlap 455 in an interlace region 454.

In some aspects of the disclosure, such as that the method 300 may include irradiating a second build plane region 152b along a second oscillating path 210 in a second direction D2 or third direction D3 different than the first direction D1 in step 340 to consolidate a second wall 853b, wherein the first wall 853a and the second wall 853b intersect at an intersection 850.

Figure 13:
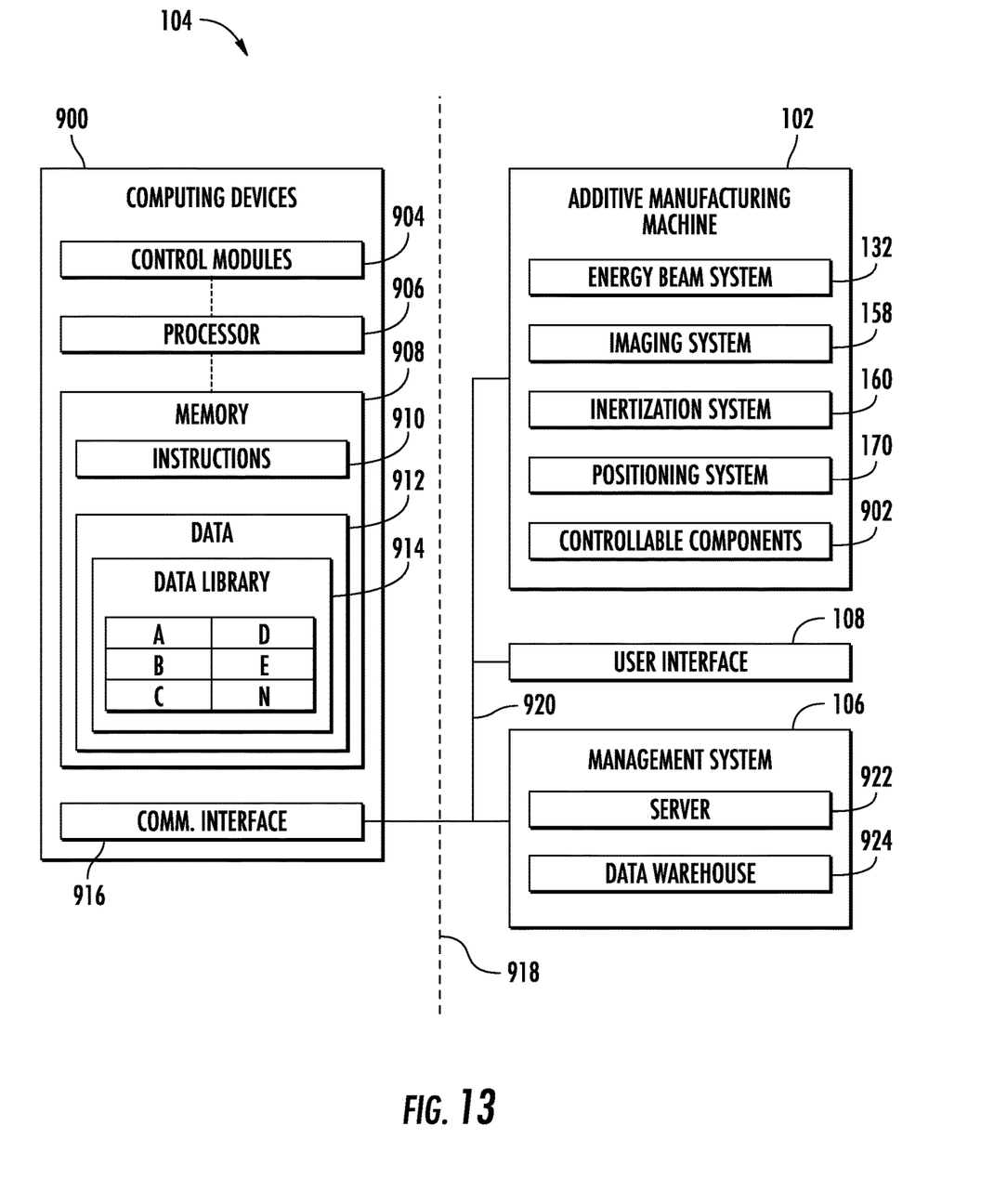
FIG. 13 schematically depicts an exemplary controls system that may be configured to control an additive manufacturing system or machine in accordance with one or more exemplary aspects of the present disclosure.

Now turning to FIG. 13, a control system 104 is illustrated. The control system 104 may be configured to perform one or more control operations associated with an additive manufacturing system 100 or an additive manufacturing machine 102. The control operations may include one or more parts of method 300 disclosed herein, or one or more operations to otherwise consolidate the three-dimensional object 114 in accordance with the disclosure presented herein.

For example, the control operations can include irradiating a first build plane region 152a using a first energy beam 134a travelling along a first oscillating path 190 in a first direction D1 to consolidate a first wall 153a, wherein a build material 118 adjacent a first side 157a of the first wall 153a and build material 118 adjacent a second side 159a of the first wall 153a, opposite the first side 157a of the first wall 153a, remains unconsolidated. The first oscillating path 190 can include a first plurality of oscillations 192 that define at least a first side 157a of the first wall 153a and a thickness T of the first wall 153a in a thickness direction DT, perpendicular to the first direction D1, can be greater than a beam diameter DB of the first energy beam 134a.

As shown in FIG. 13, a control system 104 may include one or more computing devices 900. The one or more computing devices 900 may be communicatively coupled with an additive manufacturing machine 102 or additive manufacturing system 100. For example, a computing device 900 may be communicatively coupled with one or more controllable components 902 of an additive manufacturing machine 102, such as one or more controllable components 902 associated with an energy beam system 132, an imaging system 158, an inertization system 160, or a positioning system 170. Additionally, or in the alternative, a computing device 900 may be communicatively coupled with a management system 106 or a user interface 108. The one or more computing devices 900 may be located locally or remotely relative to an additive manufacturing machine 102.

The one or more computing devices 900 may include one or more control modules 904 configured to cause the computing device 900 to perform one or more control operations. The one or more control modules 904 may include one or more irradiation control modules 800. The one or more control modules 904 may include control logic executable to provide control commands configured to control the one or more controllable components 902 associated with an additive manufacturing machine 102.

The one or more computing devices 900 may include one or more processors 906 and one or more memory devices 908. The one or more processors 906 may include any suitable processing device, such as a microprocessor, microcontroller, integrated circuit, logic device, or other suitable processing device. The one or more memory devices 908 may include one or more computer-readable media, including but not limited to non-transitory computer-readable media, RAM, ROM, hard drives, flash drives, or other memory devices 908. The one or more control modules 904 may be implemented at least in part by the one or more processors 906 or the one or more memory devices 908.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 908 may include, but is not limited to, a non-transitory computer-readable medium, such as a random-access memory (RAM), and computer-readable nonvolatile media, such as hard drives, flash memory, and other memory devices. Alternatively, a floppy disk, a compact disc-read only memory (CD-ROM), a magneto-optical disk (MOD), or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 908 may store information accessible by the one or more processors 906, including computer-executable instructions 910 that can be executed by the one or more processors 906. The computer-executable instructions 910 may include any set of instructions which when executed by the one or more processors 906 cause the one or more processors 906 to perform operations, including calibration operations, or additive manufacturing operations. For example, the computer-executable instructions 910 may be configured to cause the one or more processors 906 to perform one or more of the steps presented in method 300 (FIG. 12) or otherwise presented in this disclosure. In some aspects of the disclosure, the computer-executable instructions 910 may be configured to cause the one or more processors 906 to irradiate the first build plane region 152a using a first energy beam 134a travelling along a first oscillating path 190 in a first direction D1 to consolidate a first wall 153a, wherein a build material 118 adjacent a first side 157a of the first wall 153a and build material 118 adjacent a second side 159a of the first wall 153a, opposite the first side 157a of the first wall 153a, remains unconsolidated. The first oscillating path 190 can include a first plurality of oscillations 192 that define at least a first side 157a of the first wall 153a and a thickness T of the first wall 153a in a thickness direction DT, perpendicular to the first direction D1, can be greater than a beam diameter DB of the first energy beam 134a.

The memory devices 908 may store a plurality of data 912 accessible by the one or more processors 906. The data 912 may be past, current, real-time, or a combination thereof. The data 912 may be stored in a data library 914. As examples, the data 912 may include data 912 associated with or generated by an additive manufacturing system 100 or an additive manufacturing machine 102, including data 912 associated with or generated by a computing device 900, an additive manufacturing machine 102, a management system 106, or a user interface 108. The data 912 may also include other data sets, parameters, outputs, information, associated with an additive manufacturing system 100 or an additive manufacturing machine 102.

The one or more computing devices 900 may also include a communication interface 916 configured to communicate with various nodes on a communication network 918 via communication lines 920 that are wired or wireless. The communication interface 916 may include any suitable components for interfacing with one or more network(s), including for example, transmitters, receivers, ports, controllers, antennas, or other suitable components. The communication interface 916 may allow the one or more computing devices 900 to communicate with various nodes associated with the additive manufacturing machine 102, the management system 106, or a user interface 108. The communication network 918 may include, for example, a local area network (LAN), a wide area network (WAN), satellite communication (SATCOM) network, very high frequency (VHF) network, a high frequency (HF) network, a wireless fidelity (Wi-Fi) network, a worldwide interoperability for microwave access (WiMAX) network, a gatelink network, or any other communication network 918 for transmitting messages to or from the computing device 900 across the communication lines 920. The communication lines 920 of communication network 918 may include a data bus or a combination of wired or wireless communication links.

The management system 106 may include a server 922 or a data warehouse 924. As an example, at least a portion of the data 912 may be stored in the data warehouse 924, and the server 922 may be configured to transmit data 912 from the data warehouse 924 to the one or more computing device 900, or to receive data 912 from the one or more computing devices 900 and to store the received data 912 in the data warehouse 924 for further purposes. The server 922 or the data warehouse 924 may be implemented as part of the one or more computing devices 900 or as part of the management system 106.

While computer devices 900 and components thereof have been disclosed herein, it is appreciated that these specific aspects of the disclosure are not intended to be limiting and alternatives may further be realized within the scope of this disclosure.

Walls 153 that are both thin and uniform can be manufactured for three-dimensional objects 114 by utilizing one or more oscillating paths 190. By utilizing a plurality of oscillations 192, the thickness of the walls 153 can be reduced while still promoting consistent and uniform consolidation of build material without excessive irradiation.

Further aspects are provided by the subject matter of the following clauses:

A method of additively manufacturing a three-dimensional object, the method comprising irradiating a first build plane region using a first energy beam defining a beam diameter, the first energy beam travelling along a first oscillating path in a first direction to consolidate a first wall defining a thickness perpendicular to the first direction, wherein a build material adjacent a first side of the first wall and the build material adjacent a second side of the first wall, opposite the first side of the first wall, remains unconsolidated, and wherein the thickness of the first wall is greater than the beam diameter.

The method of any clause herein, wherein the first oscillating path comprises a first plurality of oscillations, and wherein the thickness of the first wall is between two times and five times the beam diameter of the first energy beam.

The method of any clause herein, wherein an amplitude of the first plurality of oscillations is varied along the first oscillating path.

The method of any clause herein, wherein a power of the first energy beam is adjusted when the first plurality of oscillations is varied.

The method of any clause herein, wherein the first oscillating path comprises a first plurality of oscillations that define at least the first side of the first wall.

The method of any clause herein, further comprising irradiating a second build plane region along a second oscillating path in a second direction opposite the first direction to consolidate the first wall, wherein the first oscillating path comprises a first plurality of oscillations that define the first side of the first wall, and wherein the second oscillating path comprises a second plurality of oscillations that define the second side of the first wall.

The method of any clause herein, wherein the first energy beam irradiates the second build plane region along the second oscillating path.

The method of any clause herein, further comprising irradiating a second build plane region along a second oscillating path in a second direction opposite the first direction to consolidate an extension of the first wall in the first direction, wherein the second oscillating path comprises a second plurality of oscillations, wherein the first oscillating path comprises a first plurality of oscillations, and wherein the first plurality of oscillations and the second plurality of oscillations overlap in an interlace region.

The method of any clause herein, wherein the first plurality of oscillations and the second plurality of oscillations taper in the interlace region.

The method of any clause herein, wherein an amplitude of at least one of the first plurality of oscillations and the second plurality of oscillations varies in the interlace region.

The method of any clause herein, wherein a second energy beam irradiates the second build plane region along the second oscillating path.

The method of any clause herein, further comprising irradiating a second build plane region along a second oscillating path comprising a second plurality of oscillations in a second direction different than the first direction to consolidate a second wall, wherein the first wall and the second wall intersect at an intersection.

The method of any clause herein wherein the first oscillating path comprises a first plurality of oscillations, and wherein an amplitude of at least one of the first plurality of oscillations and the second plurality of oscillations increases at the intersection.

The method of any clause herein, wherein a second energy beam irradiates the second build plane region along the second oscillating path.

An additive manufacturing system for additively manufacturing a three-dimensional object, the additive manufacturing system comprising, a first irradiation device configured to generate a first energy beam; a first optical assembly configured to direct the first energy beam; and a control system configured to perform one or more control operations associated with the additive manufacturing system, wherein the one or more control operations comprise irradiating a first build plane region using the first energy beam defining a beam diameter, the first energy beam travelling along a first oscillating path in a first direction to consolidate a first wall defining a thickness perpendicular to the first direction, wherein a build material adjacent a first side of the first wall and adjacent a second side of the first wall, opposite the first side of the first wall, remains unconsolidated; and wherein the thickness of the first wall is greater than the beam diameter of the first energy beam.

The additive manufacturing system of any clause herein, wherein the one or more control operations further comprise irradiating a second build plane region along a second oscillating path in a second direction opposite the first direction to consolidate the first wall, wherein the first oscillating path comprises a first plurality of oscillations, wherein the second oscillating path comprises a second plurality of oscillations that define the second side of the first wall. The additive manufacturing system of claim 15, wherein the one or more control operations further comprise irradiating a second build plane region along a second oscillating path in a second direction opposite the first direction to consolidate an extension of the first wall in the first direction, wherein the first oscillating path comprises a first plurality of oscillations, wherein the second oscillating path comprises a second plurality of oscillations, and wherein the first plurality of oscillations and the second plurality of oscillations overlap in an interlace region.

The additive manufacturing system of any clause herein, wherein the one or more control operations further comprise irradiating a second build plane region along a second oscillating path in a third direction different than the first direction to consolidate a second wall, wherein the first wall and the second wall intersect at an intersection.

The additive manufacturing system of any clause herein, further comprising a second irradiation device configured to generate a second energy beam; and a second optical assembly configured to direct the second energy beam, wherein the second energy beam irradiates the second build plane region along the second oscillating path.

A three-dimensional object manufactured by a method comprising irradiating a first build plane region using a first energy beam defining a beam diameter, the first energy beam travelling along a first oscillating path in a first direction to consolidate a first wall defining a thickness perpendicular to the first direction, wherein a build material adjacent a first side of the first wall and the build material adjacent a second side of the first wall, opposite the first side of the first wall, remains unconsolidated, and wherein the thickness of the first wall is greater than the beam diameter.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method of additively manufacturing a three-dimensional object, the method comprising:
   irradiating a first build plane region using a first energy beam defining a beam diameter, the first energy beam travelling along a first oscillating path having a varying first amplitude in a first direction to consolidate a first wall defining a thickness perpendicular to the first direction, wherein a build material adjacent a first side of the first wall and the build material adjacent a second side of the first wall, opposite the first side of the first wall, remains unconsolidated, and
   irradiating a second build plane region along a second oscillating path having a varying second amplitude in a second direction opposite the first direction to consolidate the first wall, wherein a portion of the first oscillating path travelling in the first direction overlaps a portion of the second oscillating path travelling in the second direction opposite the first direction,
   wherein the first oscillating path includes a plurality of first oscillations that bend around and cross itself and the second oscillating path includes a plurality of second oscillations that bend around and cross itself, and wherein the plurality of first oscillations also bend around and cross the plurality of second oscillations, and
   wherein the thickness of the first wall is greater than the beam diameter, wherein the plurality of first oscillations and the plurality of second oscillations overlap in an interlace region, and wherein the varying first amplitude increases in the interlace region and the varying second amplitude increases in the interlace region.

2. The method of claim 1, wherein the thickness of the first wall is between two times and five times the beam diameter of the first energy beam.

3. The method of claim 2, wherein the varying first amplitude is different than the varying second amplitude.

4. The method of claim 3, wherein a power of the first energy beam is adjusted when the plurality of first oscillations is varied.

5. The method of claim 1, wherein the first oscillating path comprises the plurality of first oscillations that define at least the first side of the first wall.

6. The method of claim 1, wherein the first oscillating path comprises the plurality of first oscillations that define the first side of the first wall, and wherein the second oscillating path comprises the plurality of second oscillations that define the second side of the first wall, and wherein the first oscillating path is different than the second oscillating path.

7. The method of claim 6, wherein the first energy beam irradiates the second build plane region along the second oscillating path.

8. The method of claim 1, wherein irradiating the second build plane region along the second oscillating path consolidates an extension of the first wall in the first direction, wherein the first oscillating path comprises the plurality of first oscillations, wherein the second oscillating path comprises the plurality of second oscillations, and wherein the plurality of first oscillations and the plurality of second oscillations overlap in the interlace region.

9. The method of claim 8, wherein the plurality of first oscillations and the plurality of second oscillations taper in the interlace region, and wherein the plurality of first oscillations taper until stopping.

10. The method of claim 8, wherein the varying first amplitude and the varying second amplitude vary in the interlace region.

11. The method of claim 8, wherein a second energy beam irradiates the second build plane region along the second oscillating path.

12. The method of claim 1, wherein irradiating the second build plane region along the second oscillating path comprising the plurality of second oscillations in the second direction different than the first direction consolidates a second wall, wherein the first wall and the second wall intersect at an intersection.

13. The method of claim 12, wherein the varying first amplitude and the varying second amplitude increase at the intersection.

14. The method of claim 12, wherein a second energy beam irradiates the second build plane region along the second oscillating path.

15. The method of claim 1, wherein the method further comprises:
   forming a network of walls that intersect at a plurality of intersections.

16. The method of claim 15, wherein the network of walls comprise the first wall, a second wall, a third wall, a fourth wall, a fifth wall, and a sixth wall, wherein the first wall and the second wall form a first parallel set, wherein the third wall and the fourth wall form a second parallel set, and wherein the fifth wall and the sixth wall form a third parallel set.

* * * * *